US007857720B2

(12) United States Patent
Lacy

(10) Patent No.: US 7,857,720 B2
(45) Date of Patent: Dec. 28, 2010

(54) SYNCHRONOUS BELT DRIVE SYSTEM

(75) Inventor: Fraser Lacy, Dumfries (GB)

(73) Assignee: The Gates Corporation, Denver, CO (US)

(*) Notice: Subject to any disclaimer, the term of this patent is extended or adjusted under 35 U.S.C. 154(b) by 133 days.

(21) Appl. No.: 11/906,191

(22) Filed: Oct. 1, 2007

(65) Prior Publication Data

US 2008/0085799 A1   Apr. 10, 2008

Related U.S. Application Data

(60) Provisional application No. 60/850,080, filed on Oct. 9, 2006.

(51) Int. Cl.
   *F16H 55/30* (2006.01)
   *F16H 55/08* (2006.01)
(52) U.S. Cl. .................. 474/141; 474/87; 474/148
(58) Field of Classification Search ............ 474/87, 474/141, 148
   See application file for complete search history.

(56) References Cited

U.S. PATENT DOCUMENTS

| | | | | |
|---|---|---|---|---|
| 515,449 A * | 2/1894 | Scovell | ................ | 474/141 |
| 3,583,250 A | 6/1971 | Kongelka | ................ | 74/226 |
| 3,752,035 A | 8/1973 | Cozzy et al. | ................ | 89/13 |
| 4,193,324 A | 3/1980 | Marc | ................ | 74/750 |
| 4,865,577 A | 9/1989 | Freudenstein | ................ | 474/141 |
| 5,492,390 A | 2/1996 | Kugelmann, Sr. | ................ | 301/5.1 |
| 5,772,546 A | 6/1998 | Warszewski | ................ | 474/50 |
| 5,882,025 A * | 3/1999 | Runnels | ................ | 280/259 |
| 7,044,875 B2 | 5/2006 | Gajewski | ................ | 474/148 |
| 7,232,391 B2 * | 6/2007 | Gajewski | ................ | 474/141 |
| 2003/0104886 A1 | 6/2003 | Gajewski | ................ | 474/87 |

FOREIGN PATENT DOCUMENTS

| | | |
|---|---|---|
| DE | 10 2004 027 064 A1 | 12/2005 |
| WO | WO 2005/119087 A1 | 12/2005 |
| WO | WO 2005/119090 A1 | 12/2005 |

OTHER PUBLICATIONS

Notification of Transmittal of the International Search Report and the Written Opinion of the International Searching Authority, or the Declaration from the International Searching Authority Mailed on Apr. 25, 2008.

* cited by examiner

*Primary Examiner*—Michael R Mansen
*Assistant Examiner*—Henry Liu
(74) *Attorney, Agent, or Firm*—Jeffrey A. Thurnau, Esq.; Paul N. Dunlap, Esq.; Thomas A. Dougherty, Esq.

(57) ABSTRACT

A synchronous belt drive system comprising an obround sprocket (10) having a toothed surface and at least one linear portion (16) disposed between two arcuate portions (14,15), the arcuate portions having a constant radius (R1, R2), the linear portion having a predetermined length, a second sprocket (300) having a toothed surface, the second sprocket engaged to the obround sprocket by an endless toothed member (200), the second sprocket connected to a rotary load, the rotary load having cyclic torque fluctuations, and a radius (R1) of the obround sprocket (10) oriented at a belt entry point (201) which coincides with a maximum amplitude of a cyclic torque fluctuation such that a span length (SL) of the endless toothed member is made to vary in a manner that substantially cancels the cyclic torque fluctuations.

6 Claims, 11 Drawing Sheets

SYNCHRONOUS BELT DRIVE SYSTEM

REFERENCE TO RELATED APPLICATIONS

This application claims priority from U.S. provisional application Ser. No. 60/850,080 filed Oct. 9, 2006.

FIELD OF THE INVENTION

The invention relates to a synchronous belt drive system, and more particularly to a system having an obround sprocket.

BACKGROUND OF THE INVENTION

A wide variety of automotive and industrial internal combustion engines routinely rely upon a synchronous belt drive system to transmit torque from a driver sprocket on a crankshaft to a driven sprocket such as on a camshaft. Camshafts produce vibrations which can be detrimental to the operating life of the engine and synchronous belt. In particular, actuation of the intake and exhaust valves though contact with the camshaft lobes causes a cyclic fluctuating torque load to be transmitted through the synchronous belt.

Prior art attempts to attenuate the fluctuating torque loads include use of camshaft dampers as well as damped belt tensioners.

Teachings disclose the use of non-circular (oval) sprockets to control strongly fluctuating torques, for example, VDI Progress Reports No. 272, "Non-Uniform Transmission Belt Drives" by Dipl.-Ing. Egbert Frenke.

Other attempts include use of a rotor having an oval non-circular profile having at least two protruding alternating with receding portions. The rotary load assembly presents a periodic fluctuating load torque when driven in rotation in which the angular positions of the protruding and receding portions of the non-circular profile relative to the angular position of the second rotor, and their magnitude, substantially cancels the alternating belt tensions caused by fluctuating load torque of the rotating assembly.

Representative of the art is U.S. Pat. No. 7,044,875 which discloses a synchronous drive apparatus and method, wherein the apparatus comprises a plurality of rotors comprising at least a first and a second rotor. The first rotor has a plurality of teeth for engaging the engaging sections of an elongate drive structure, and the second rotor has a plurality of teeth for engaging the engaging section of the elongate drive structure. A rotary load assembly is coupled to the second rotor. The elongate drive structure engages about the first and second rotors. The first rotor is arranged to drive the elongate drive structure and the second rotor is arranged to be driven by the elongate drive structure. One of the rotors has a non-circular profile having at least two protruding portions alternating with receding portions. The rotary load assembly is such as to present a periodic fluctuating load torque when driven in rotation, in which the angular positions of the protruding and receding portions of the non-circular profile relative to the angular position of the second rotor, and the magnitude of the eccentricity of the non-circular profile, are such that the non-circular profile applies to the second rotor an opposing fluctuating corrective torque which reduces or substantially cancels the fluctuating load torque of the rotary load assembly.

What is needed is a belt drive sprocket system comprising an obround sprocket having a toothed surface and at least one linear portion disposed between two circular portions, the circular portions having a constant radius, the linear portion having a length which relates to a torque fluctuation amplitude.

SUMMARY OF THE INVENTION

The primary aspect of the invention is to provide a belt drive sprocket system comprising an obround sprocket having a toothed surface and at least one linear portion disposed between two circular portions, the circular portions having a constant radius, the linear portion having a length which relates to a torque fluctuation amplitude.

Other aspects of the invention will be pointed out or made obvious by the following description of the invention and the accompanying drawings.

The invention comprises a synchronous belt drive system comprising an obround sprocket having a toothed surface and at least one linear portion disposed between two arcuate portions, the arcuate portions having a constant radius, the linear portion having a predetermined length, a second sprocket having a toothed surface, the second sprocket engaged to the obround sprocket by an endless toothed member, the second sprocket connected to a rotary load, the rotary load having cyclic torque fluctuations, and a radius of the obround sprocket oriented at a belt entry point which coincides with a maximum amplitude of a cyclic torque fluctuation such that a span length of the endless toothed member is made to vary in a manner that substantially cancels the cyclic torque fluctuations.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
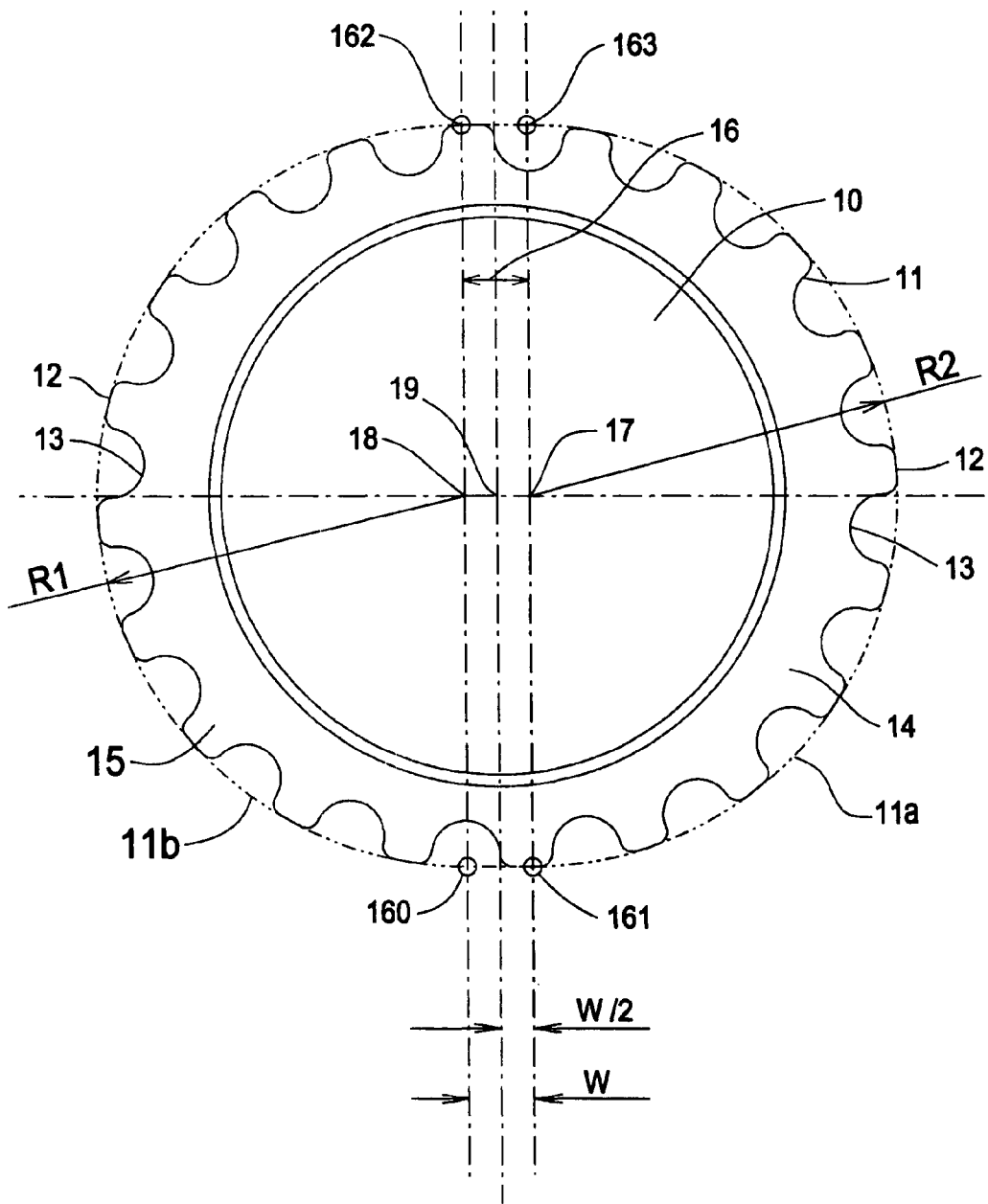
FIG. 1 is a side view of an obround sprocket.

FIG. 1 is a side view of an obround sprocket. The inventive sprocket 10 comprises a toothed surface 11. Toothed surface 11 engages a toothed belt. Toothed surface 11 comprises land areas 12 and adjacent grooves 13. The grooves 13 have a shape that is compatible with the corresponding design of a tooth form of a toothed belt. Toothed belts are also referred to as synchronous belts since they are used to synchronize the rotation of a driver and driven sprocket.

Sprocket 10 comprises portion 14 and portion 15. Portion 14 has an arcuate toothed surface 11a which comprises a constant radius R2. Portion 15 has an arcuate toothed surface 11b which comprises a constant radius R1. Portions 14 and 15 are segments of a circle since the radii R1 and R2 are equal and constant. Use of circular segments in this manner reduces the complexity of the design and manufacturing process for the inventive sprocket.

Disposed between portion 14 and portion 15 is linear portion 16. Portion 16 comprises a rectangular section which has the effect of displacing each portion 14 and 15 from each other, thus giving the obround shape to the sprocket. The sprocket surface 11 is straight, i.e., linear or flat between points 160 and 161, and 162 and 163.

The flat portion 16 has a length which relates to a system torque fluctuation amplitude. In this embodiment portion 16 has a dimension (W) of approximately 2 mm between points 160 and 161, and 162 and 163. Hence, the center of curvature 17 of portion 14 is displaced by a distance of W/2, approximately 1 mm, from the center of rotation 19 of the sprocket. Also, the center of curvature 18 of portion 15 is displaced by a distance of W/2, approximately 1 mm, from the center of rotation 19 of the sprocket. The dimensions given are only for the purpose of illustration and are not intended to be limiting. It also follows that a major length (ML) of the sprocket has a dimension:

$$L_{major} = R1 + R2 + W.$$

A major segment (MG) for each portion 14, 15 has a dimension:

$$MG = (R1 + W/2) \text{ or } (R2 + W/2).$$

A minor length has a dimension:

$$L_{minor} = R1 + R2$$

The length (W) of portion 16 is determined by the radius of portions 14 and 15 and is dependent on the dynamic angular vibration characteristic which is being counteracted which is described elsewhere in this specification. Sprocket 10 can be designed using constant surface pitch, constant angular pitch or a combination of the two. "Surface Pitch" is defined as the distance between any two consecutive, corresponding, "pitch points" on the OD of the sprocket, measured around the OD line. Constant Surface Pitch is calculated as follows:

$$SP = (((((Ng \times Nom \text{ Pitch})/Pi) - PLD) \times Pi)/Ng)$$

Where
SP=Surface Pitch
Ng=Number of grooves in sprocket
Nom Pitch=Nominal system pitch
Pi=~3.141
PLD=Diametral PLD of the system "Angular Pitch" is defined as the angular difference between any two consecutive, corresponding "pitch points" on a sprocket and may be measured in degrees or radians. Constant Angular Pitch is defined as follows:

$$AP = 360/Ng \text{ Degrees}$$

Where
AP=Angular Pitch
Ng=Number of grooves in sprocket
The sprocket groove profile can be individually designed to suit the particular dynamics of the engine The elastic modulus of the span of the belt, in combination with the tooth modulus and the sprocket offset (W/2) is optimized to cancel torque fluctuations at predetermined engine speeds. Consequently, in this application the belt is analyzed and designed as a spring member of the system in addition to being sized to transmit the required tensile loads. The system dynamic response is selected by iterative process to arrive at a combination of belt modulus and obround sprocket radius (R1 and R2) which cancels substantially all of the torque fluctuations otherwise transmitted through the belt and the belt drive system.

Figure 2:
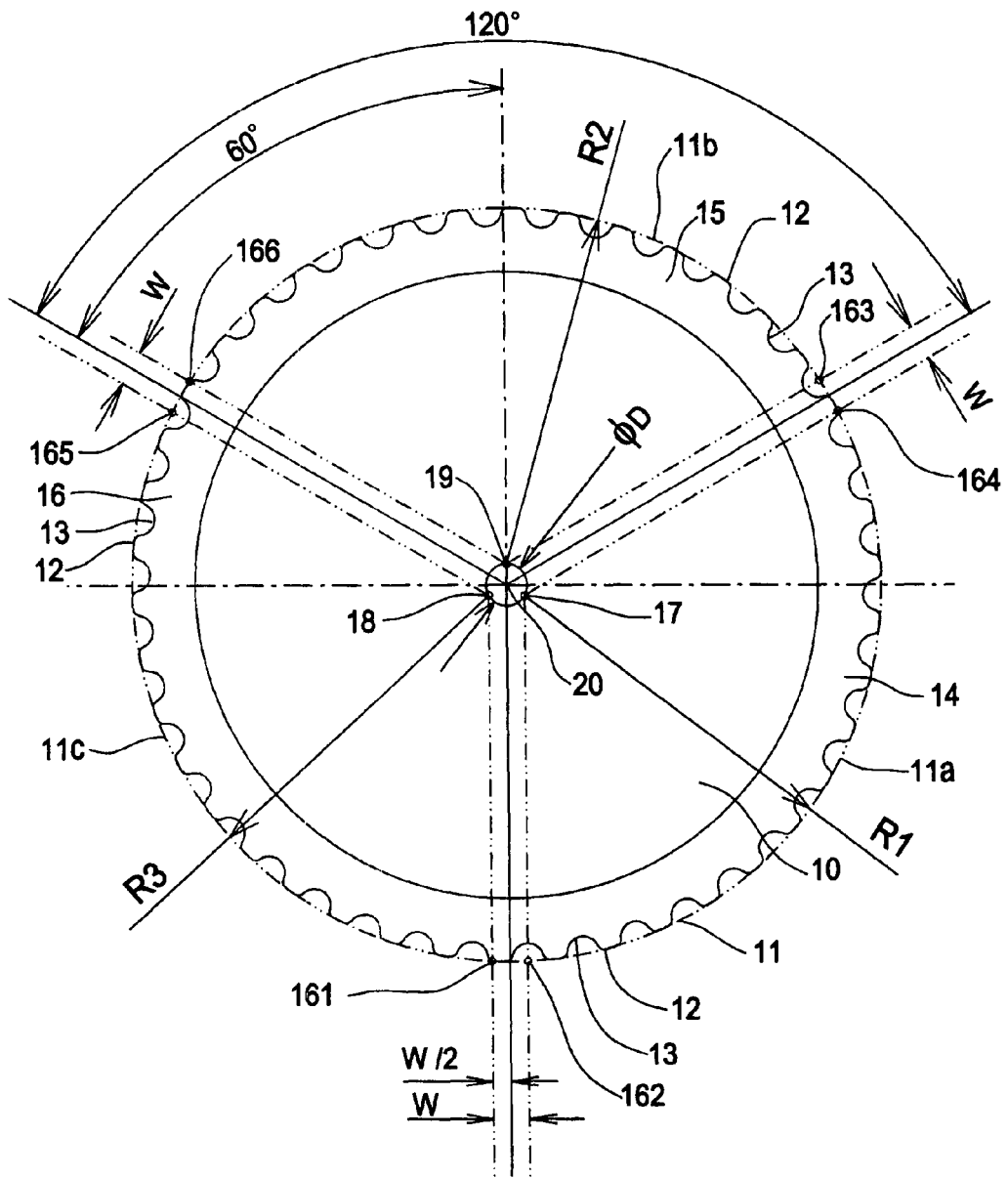
FIG. 2 is a side view of an alternative embodiment of the sprocket.
Figure 9:
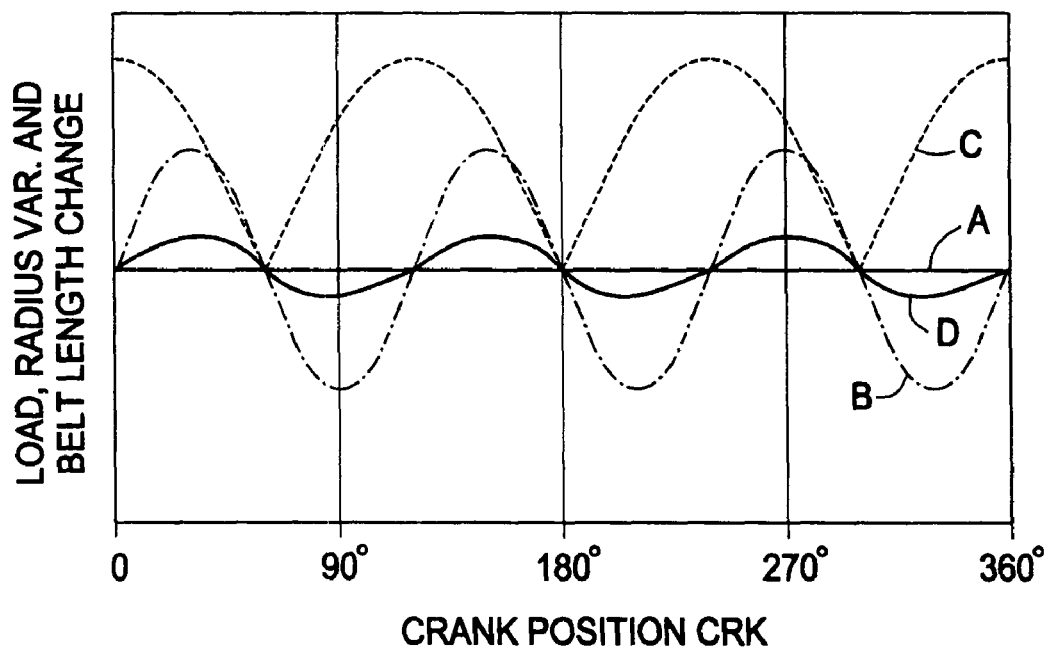
FIG. 9 is representative of the $1.5^{th}$ order load characteristic for a driver sprocket of a four cylinder, four stroke diesel engine with 3 piston fuel pump, (or other device inducing a $1.5^{th}$ order).

FIG. 2 is a side view of an alternate embodiment of the sprocket. This embodiment comprises three linear segments disposed between arcuate portions 14, 15, 16 as otherwise described in FIG. 1. The three linear segments (161 to 162) and (163 to 164) and (165 to 166) are disposed between each arcuate portion 14, 15, 16. Each arcuate portion 14, 15, 16 comprises, respectively, constant and equal radii R1, R2, R3. The three linear segments are equally spaced about the circumference of the sprocket at intervals of approximately 120°. FIG. 9 is representative of the $1.5^{th}$ order load characteristic in a system using the sprocket shown in FIG. 2.

Figure 3:
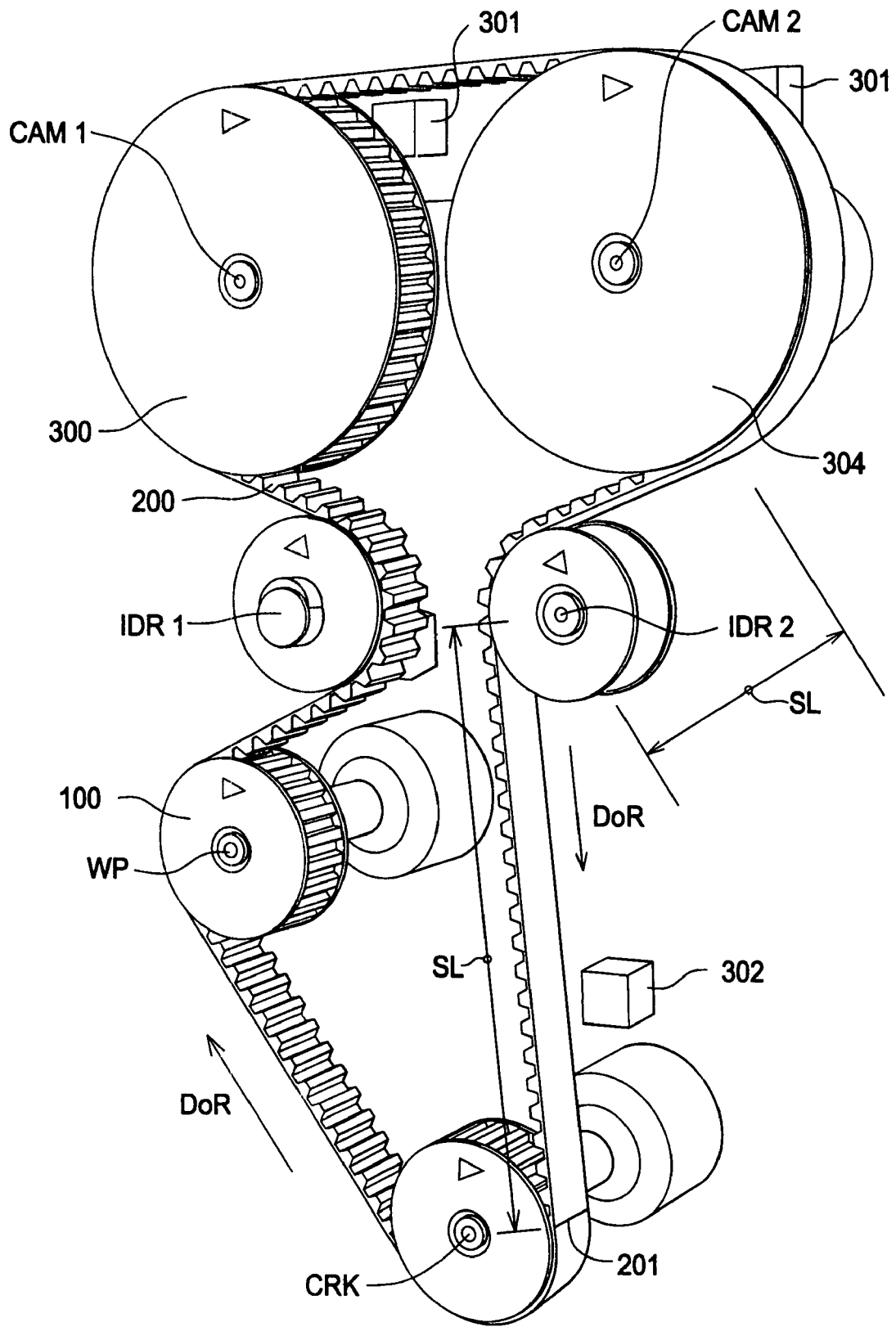
FIG. 3 is a perspective view of a twin cam, four cylinder, four stroke, gasoline engine.
Figure 4:
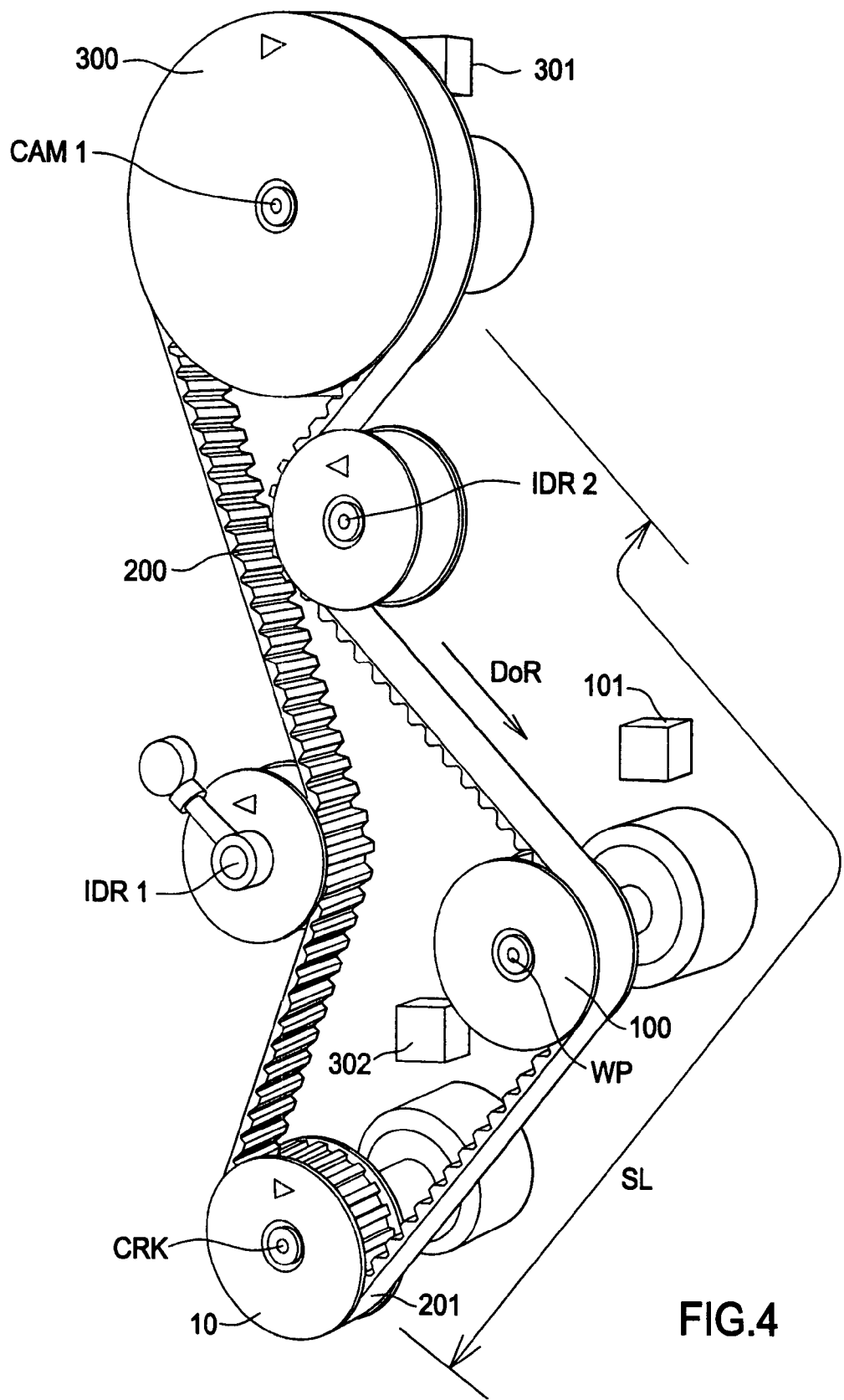
FIG. 4 is a perspective view of a single cam, four cylinder, four stroke, diesel driven engine which has a fuel pump driven at the rear of the camshaft.
Figure 5:
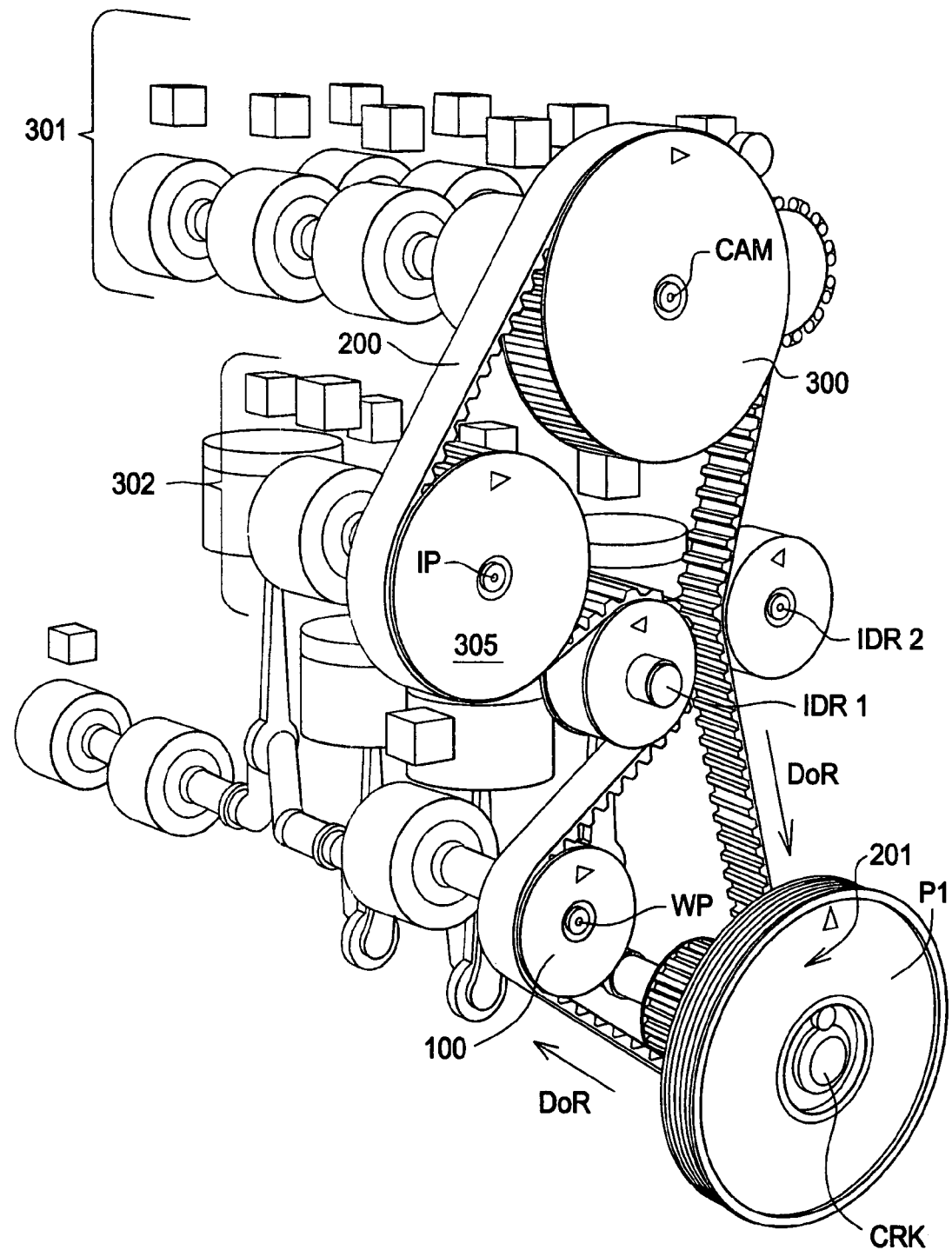
FIG. 5 is a perspective view of a single cam, four cylinder, four stroke, diesel driven engine with the fuel pump incorporated in the synchronous belt drive system.

FIGS. 3, 4 and 5 are some typical drive layouts for four cylinder, four stroke internal combustion engines using a toothed belt system to drive the camshaft and auxiliaries. These engines typically exhibit a high $2^{nd}$ order dynamic. Dependant upon fuel pump specification, some diesel engines may have a $1.5^{th}$ order which is dominant. Schematic diagrams showing such dynamics can be seen in FIGS. 7, 8 and 9.

In order to counteract $2^{nd}$ order dynamics, the inventive sprocket 10 is attached to the engine crankshaft Crk. Dependant on the presence of other dominant orders, it may be necessary to apply alternative embodiments of the sprocket. These may be attached to the crankshaft, but may equally be applied elsewhere in the system, for example on the water pump sprocket or on the camshaft sprocket(s). The engine crankshaft is the driver for the entire belt drive system. The driven direction of the belt is DoR. Due to the sprocket ratio, the engine crankshaft Crk rotates twice for each rotation of the camshaft CAM1.

In FIG. 3, sprocket 300 is connected to the camshaft CAM1 and sprocket 304 is connected to a second camshaft CAM2. Idlers Idr1 and Idr2 known in the art are used to maintain proper belt routing and tension control. Sprocket 100 is connected to the water pump WP. Belt 200 is trained among the several sprockets. The direction of rotation for belt 200 is shown as DoR. The point at which belt 200 engages crankshaft sprocket CRK is 201. The camshaft inertia and torque loads are represented by 301.

Toothed belt 200 is trained between sprocket 10 and cam sprocket 300. The belt entry point 201 is that point at which the belt 200 engages the sprocket. The inventive system minimizes torque fluctuations by timing the position of entry point 201 with the major length (ML) of the sprocket 10. The belt span length between the crankshaft CRK and the cam sprocket 304 is "SL".

Similarly in FIGS. 4 and 5, camshaft sprocket 300 is attached to the engine camshaft CAM. In FIG. 4, the load characteristic 301 includes the torque characteristic of a fuel pump attached to the rear of the camshaft whereas in FIG. 5, the fuel pump torque is represented by load characteristic 302. Inertias and torque loads (301, 302, 101) caused by other components such as water and vacuum pumps may also be present as well, namely, WP (101) in FIG. 4 and FIG. 5. In FIG. 4 IDR1 and IDR2 are idlers known in the art to properly guide belt 200. In FIG. 4, the belt span length between the crankshaft sprocket 10 and the cam sprocket 300 is "SL".

For a gasoline engine the dominant cyclic fluctuating torque loads are normally a characteristic of the camshaft. For a diesel engine the dominant order can be produced by the camshaft and/or a fuel injection pump which may be included in the drive system. The torques caused by the water pump and vacuum pump may vary but they are not cyclic, within their own right, on the same period or frequency as the camshafts and are not normally dominant characteristics of the drive dynamics.

FIG. 5 is a perspective view of another single cam engine embodiment with fuel injection pump included in the drive for a diesel engine. In this embodiment, in addition to the system shown in FIG. 4 the system further comprises sprocket 305 connected to the fuel pump IP. Also shown is sprocket P1 which is engageable with another multi-rubbed belt used to drive various engine accessories (not shown). In FIG. 5 the cam loads are depicted by 301 and the fuel pump load by 302. Sprocket 100 is connected to the water pump WP. In FIG. 5 the torque load caused by a fuel injection pump is represented by 302.

Figure 7:
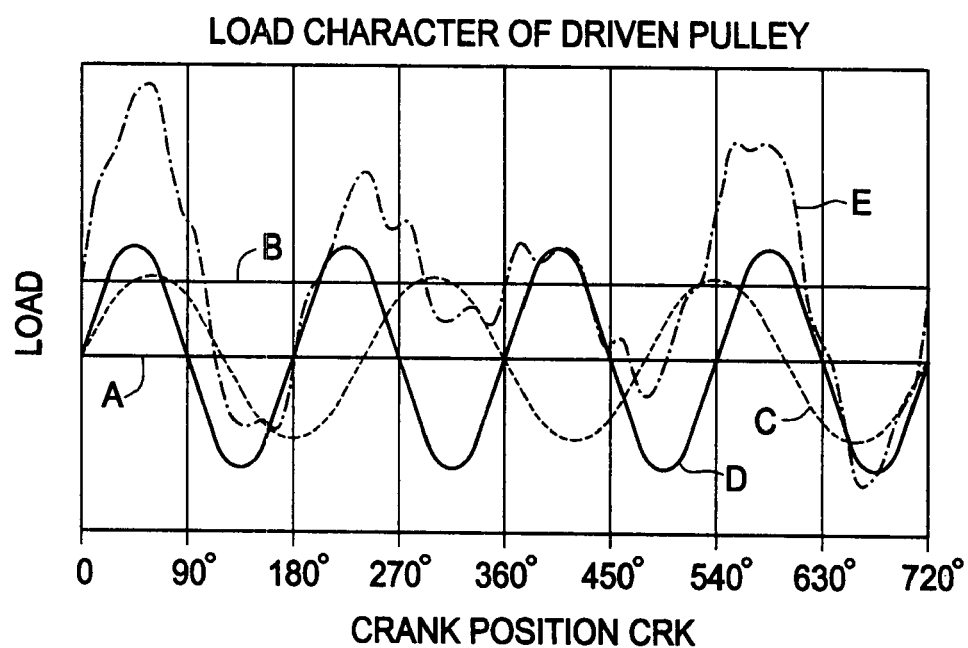
FIG. 7 is representative of a typical total load characteristic for the driven sprocket of a four cylinder, four stroke diesel engine, including extracted curves for the $1.5^{th}$ and $2^{nd}$ orders.

A typical total load characteristic for a four cylinder, four stroke engine is represented by curve "E" in FIG. 7. Curves "D" and "C" represent typical $2^{nd}$ and $1.5^{th}$ order characteristics which have been extracted from the total load characteristic. The load characteristic of a four cylinder, four stroke, gasoline driven engine would not normally include a $1.5^{th}$ order.

Figure 8:
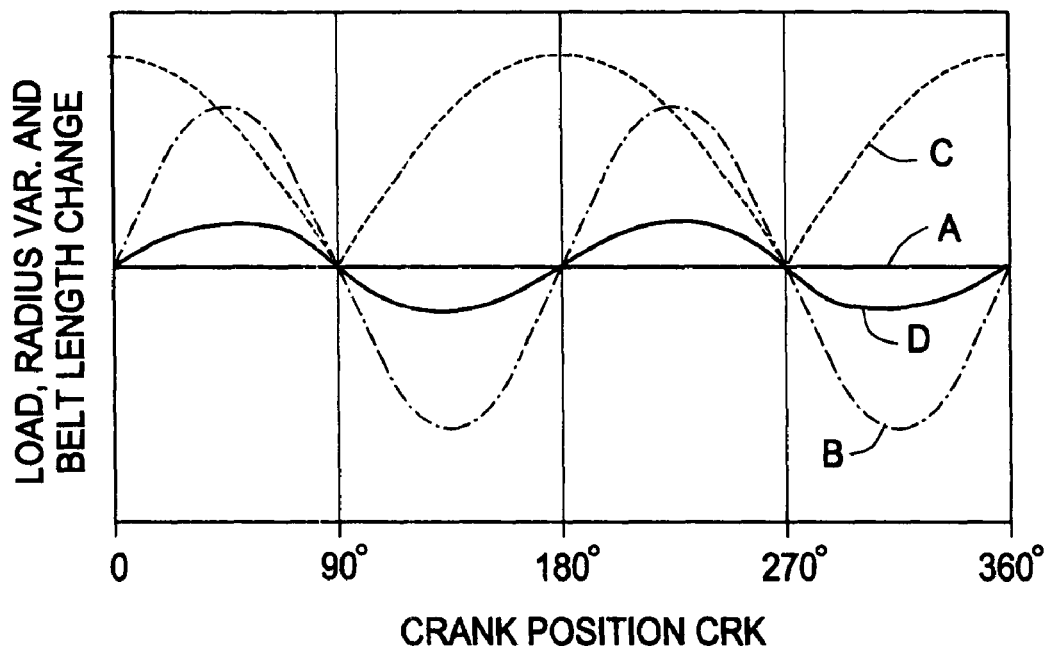
FIG. 8 is representative of the $2^{nd}$ order load characteristic for a driver sprocket of a four cylinder, four stroke engine.

The change in average radius at belt engagement point 201 of the inventive sprocket 10 as it rotates is curve "C" in FIGS. 8 and 9. The integral of curve "C", which is the effective length change of the belt in FIG. 4, is curve "D" on FIGS. 8 and 9. The derivative of the change in average sprocket radius is the acceleration of a given point on the toothed surface, 11, due to the change in sprocket shape.

In order to counteract $2^{nd}$ order dynamics, the flat portion 16 of the obround sprocket 10 is arranged in timing relation to the camshaft sprocket 300 such that an effective length of the belt 200 between sprocket 300 and sprocket 10 in FIG. 4 is made to vary in a manner that substantially cancels the alternating belt tensions caused by the cyclic camshaft torque fluctuations. As an example of a design to cancel $2^{nd}$ order dynamics, this can be achieved by timing the maximum length of the sprocket 10 (R1+R2+W) to coincide with the belt entry point 201 when the camshaft torque, and therefore belt tension, is at a maximum.

The absolute dimensional characteristic of a drive containing an obround sprocket is dependant on parameters such as the fluctuating torque, the belt span modulus, the inertias of each of the driven accessories in the system, the belt installation tension and the interaction between the belt and sprockets. The interaction between the belt and sprockets is dependant on parameters such as the number of teeth in mesh on the sprocket, the belt tooth modulus, the belt dimensions and the coefficient of friction between the belt and sprocket surfaces.

Figure 6:
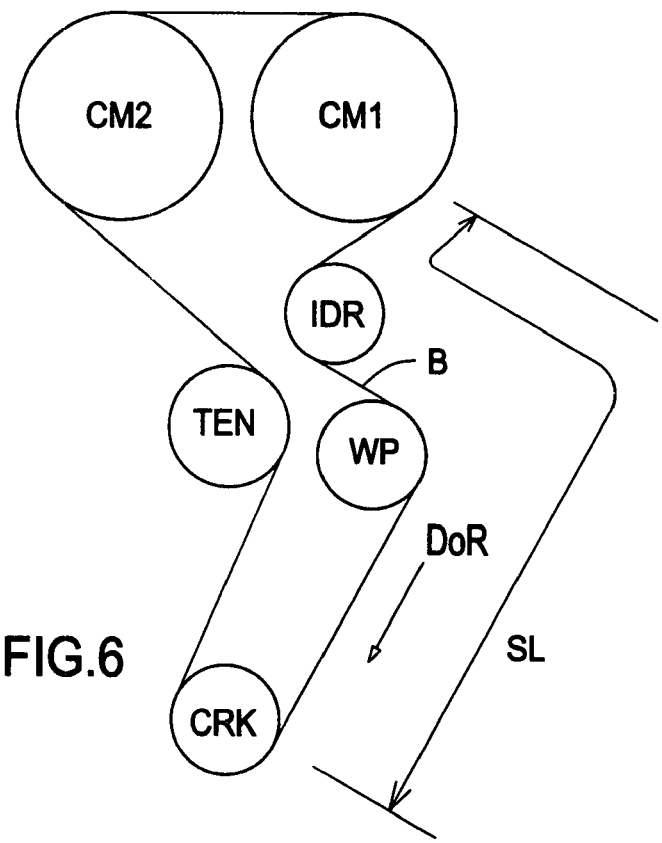
FIG. 6 is a schematic of a twin cam, four cylinder, four stroke, gasoline driven engine.

FIG. 6 is a schematic of a twin cam, four cylinder, four stroke gasoline engine. The illustrative system comprises cams CM1, CM2 and belt B trained there between. It further comprises tensioner TEN, water pump WP and crankshaft sprocket CRK. The direction of rotation of belt B is DoR. The span lengths of interest are between sprocket CRK and sprocket IDR, sprocket IDR and sprocket WP and sprocket CRK and sprocket WP. In FIG. 6, the belt span length between the crankshaft sprocket CRK and the cam sprocket CM1 is "SL". For calculation purposes since there is no major load impact between CM1 and CRK in DoR, these may be treated as one span "SL". Approximate typical values for the variables for the system described in FIG. 6 are as follows:

Typical Cam Torque fluctuations are: 20 to 40 Nm/−10 to −30 N/m

Belt Span Modulus: 240 Mpa

Typical component inertia values are:

CRK=0.4 gm$^2$

CM1=CM2=1.02 gm$^2$

WP=0.15 gm$^2$

Belt Installation Tension: 400N (The installation tension is maintained by the tensioner TEN in a manner known in the art).

Teeth in mesh on three sprockets: CRK⇒9 teeth; CM1, CM2⇒15 teeth.

Belt dimensions: width=25.4 mm; length=1257.3 mm

Typical values for the coefficient of friction for the sprocket surface 11 are in a range from 0.15 and 0.5, typically 0.2.

Typical belt installation tension values can be in the range of 75N up to 900N depending upon system requirements.

The belt span modulus is dependant on the tensile member construction, the number of strands of the tensile member within the belt and the belt width. An example of belt span modulus for a 25.4 mm wide belt having 20 tensile members would be in the region of approximately 240 Mpa.

FIG. 7 is representative of a typical total load characteristic for the driven sprocket of a four cylinder, four stroke diesel engine, including extracted curves for the $1.5^{th}$ (curve "C") and $2^{nd}$ (curve "D") orders. The load characteristic of a four cylinder, four stroke, gasoline driven engine would not normally include a $1.5^{th}$ order. The "Offset" refers to W/2. The "Total Load" refers to FIG. 7, line "E".

In FIG. 7, Line "A" is zero torque. Line "B" depicts the average torque in the belt drive system. Curve "C" is the $1.5^{th}$ order torque characteristic extracted from the total load curve "E". Curve "D" is the $2^{nd}$ order torque characteristic extracted from the total load curve "E". Curve "E" is the total torque characteristic of the engine measured at the crankshaft CRK. The area under curve "E" represents the work done to turn the engine at a particular speed.

FIG. 8 is representative of the $2^{nd}$ order load characteristic (curve "B") for a driver sprocket of a four cylinder, four stroke engine including the change in radius (curve "C") for an obround sprocket and the resultant belt span length change (curve "D").

In FIG. 8, line "A" is zero torque. Curve "B" is the $2^{nd}$ order torque characteristic extracted from the total load. Curve "C" is the variation in effective crankshaft pulley radius as it rotates through 360 degrees caused by segment 16 in FIG. 1. Curve "D" is the integral of curve "C" and is the effective change in belt drive span length caused by the sprocket described in FIG. 1.

FIG. 9 is representative of the $1.5^{th}$ order load characteristic "B" for a driver sprocket of a four cylinder, four stroke diesel engine with a three piston fuel pump, (or other driven device that will induce a $1.5^{th}$ order), including the change in sprocket radius length (curve "C") for an alternative three lobe embodiment of the obround sprocket (FIG. 2) and the resultant belt span length change (curve "D"). Belt span length is the distance between the cam sprocket CAM and crankshaft sprocket CRK on FIG. 6 for example.

In FIG. 9, line "A" is zero torque. Curve "B" is the $1.5^{th}$ order torque characteristic extracted from the total load. Curve "C" is the variation in effective crankshaft pulley radius as it rotates through 360 degrees. Curve "D" is the integral of curve "C" and is the effective change in drive length caused by the alternate embodiment of the sprocket described in FIG. 3.

Figure 10:
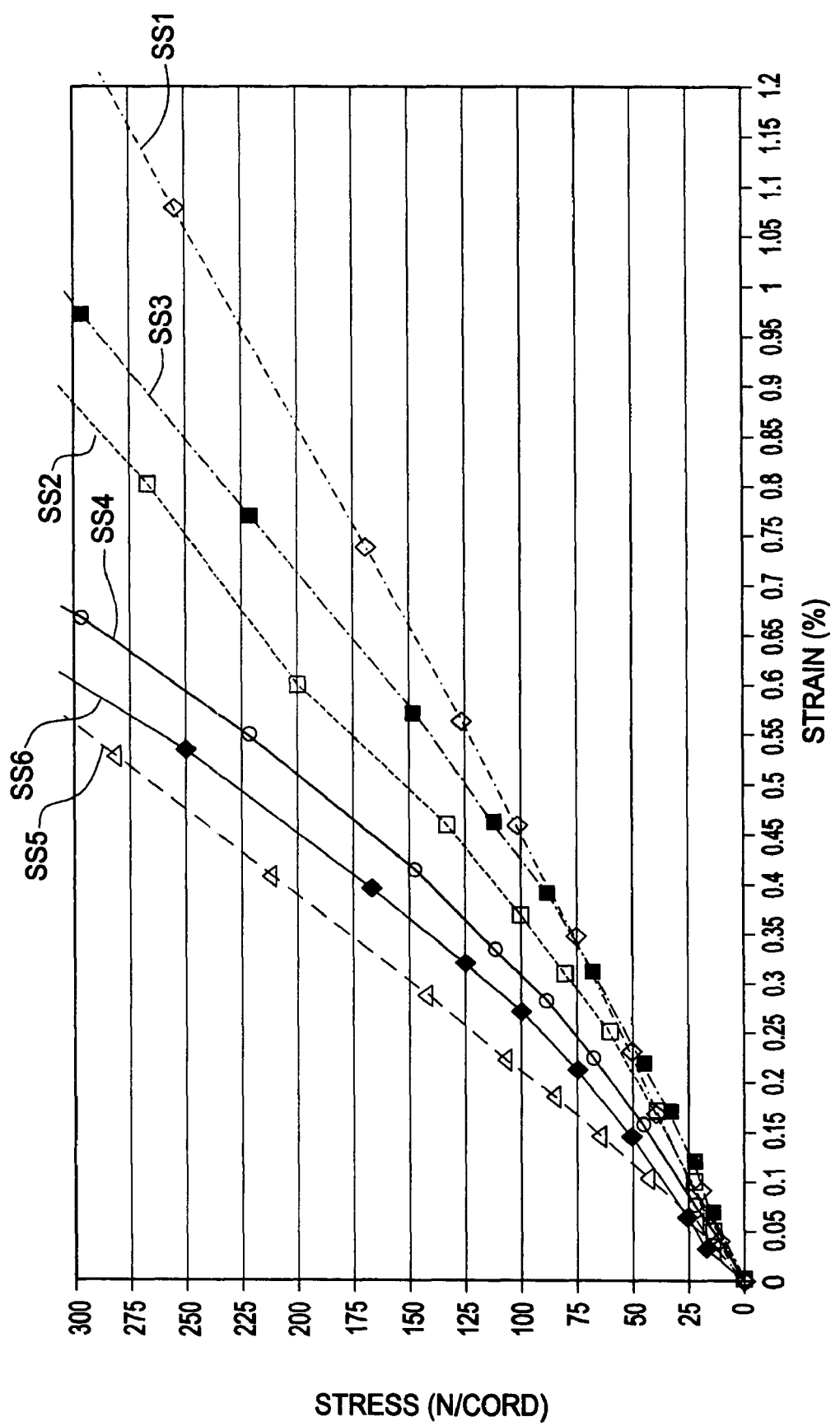
FIG. 10 is a family of curves representing stress/strain relationships for a synchronous belt.

The elastic modulus of a tensile member of a variety of belts used in the inventive system is shown in FIG. 10. The curves SS1 thru SS6 are known as stress-strain curves for a variety of belts 200. Each curve represents a modulus using a different material for the tensile cord in the belt. The elastomeric HNBR belt body is illustrative and not limiting. IN addition to HNBR, other belt body materials can include EPDM, CR and poylurehthane, or a combination of two or more of the foregoing. The materials comprise for:

SS1 (fiberglass #1 tensile cord, HNBR body)
SS2 (fiberglass #2 tensile cord, HNBR body)
SS3 (fiberglass #3 tensile cord, HNBR body)
SS4 (carbon fiber tensile cord, HNBR body)
SS5 (Aramid™ tensile cord, HNBR body)
SS6 (carbon fiber tensile cord, HNBR body).

The elastic modulus of each tensile member is the slope of each curve SS1 thru SS6, as is known in the art. Typically this measurement and calculation is taken on the substantially linear portion of the curve. In addition to fiberglass, carbon fiber and Aramid™, another tensile member material may include fine filament stainless steel wire.

$M=\Delta stress/\Delta strain$ (as measured in the substantially linear portion of the curve)

The belt span modulus is dependant on the tensile member construction, the number of strands of the tensile member within the belt and the belt width. An example of belt span modulus for curve SS1, for a 25.4 mm wide belt with 20 strands of fiberglass tensile member, would be approximately 242 Mpa.

Figure 11:
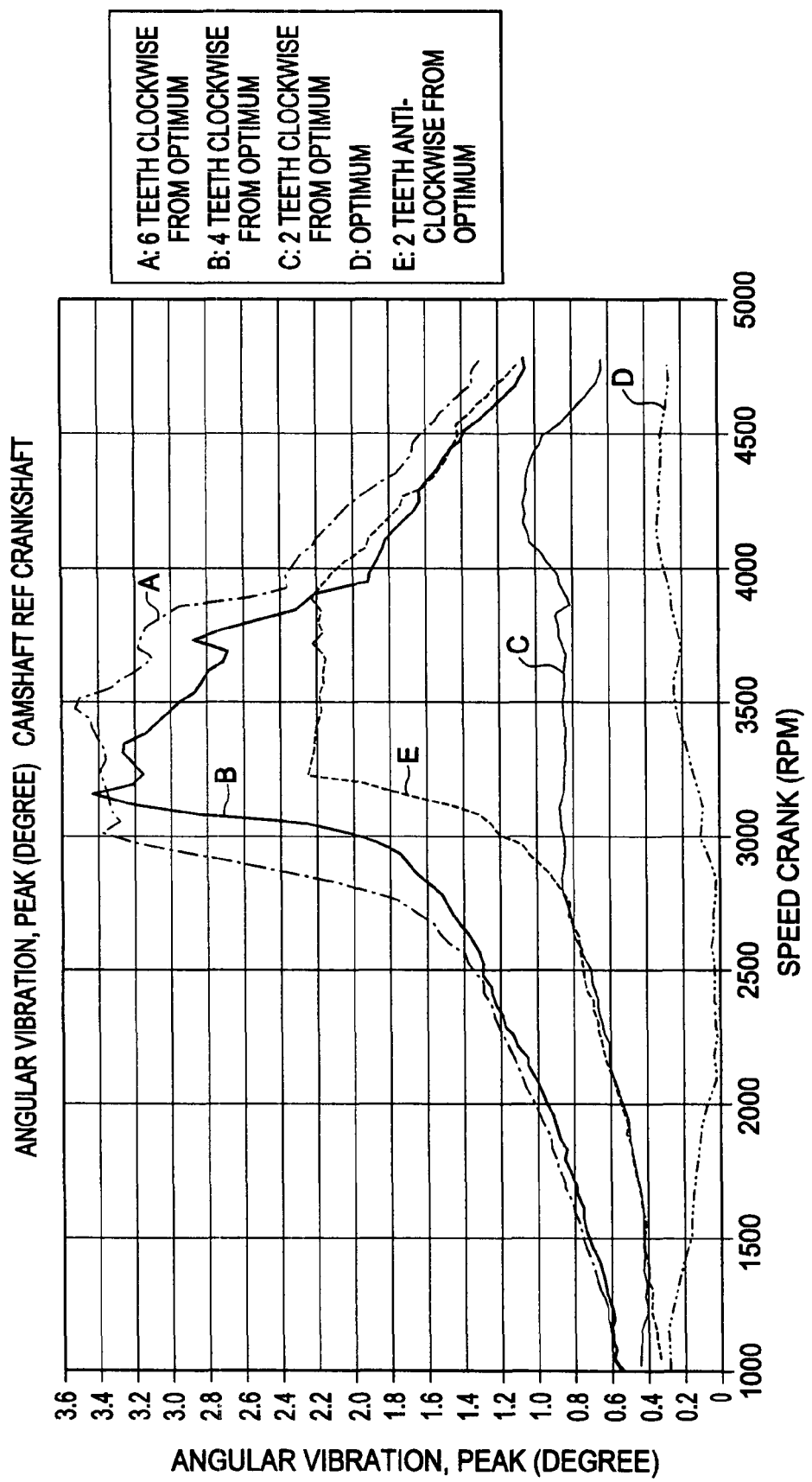
FIG. 11 is a series of curves showing the effects of the phasing/misphasing of an obround sprocket on the engine dynamic for the system in FIG. 6.

FIG. 11 is a series of curves showing the effects of the phasing/misphasing of an obround sprocket major length on the engine dynamic for the system in FIG. 6. Curve "D" is the optimum timing arrangement between the position of the sprocket major length to belt entry point 201 and torque pulse. Curves A, B, and C are mistimed clockwise from the curve "A" position by +6 +4 and +2 teeth respectively. Curve "E" is mistimed by 2 teeth in an anticlockwise direction. Phasing of maximum belt span length to peak torque and inertial load may vary dependent on the dominant orders of the drive and those which are to be diminished by the system. The belt entry point 201 is that point at which the belt engages the sprocket. In FIG. 3 the span length is "SL".

Regarding angular interval or phasing the allowable angular tolerance is calculated using the following:

+/−(360/2×number of sprocket grooves).

The belt drive span length is at a maximum when the torque is at a maximum.

Figure 12:
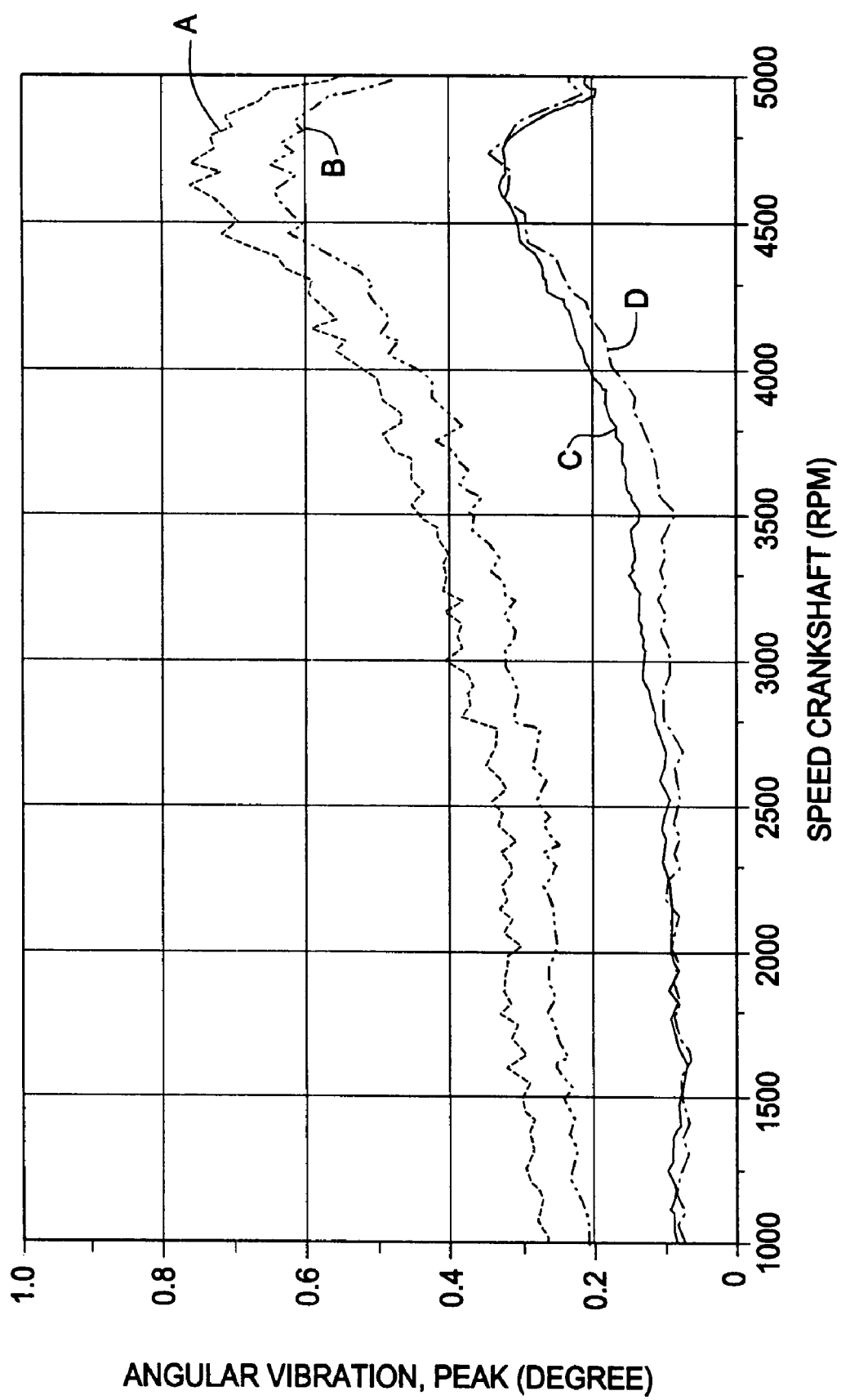
FIG. 12 is a chart showing the Angular Vibration characteristic at the camshaft of an engine shown in FIG. 6 before and after application of an obround sprocket.

FIG. 12 is a chart showing the effect of a correctly phased obround sprocket on a twin cam, four cylinder, four stroke engine as depicted in FIG. 6. Curves "A" and "B" represent measured values for angular vibration at the inlet and exhaust camshaft sprockets respectively for a prior art design using round sprockets.

By way of comparison, curves "C" and "D" represent measured values for angular vibration at the inlet and exhaust camshaft sprockets respectively with an inventive sprocket used on the crankshaft. The resultant reduction in angular vibration is approximately 50%.

Figure 13:
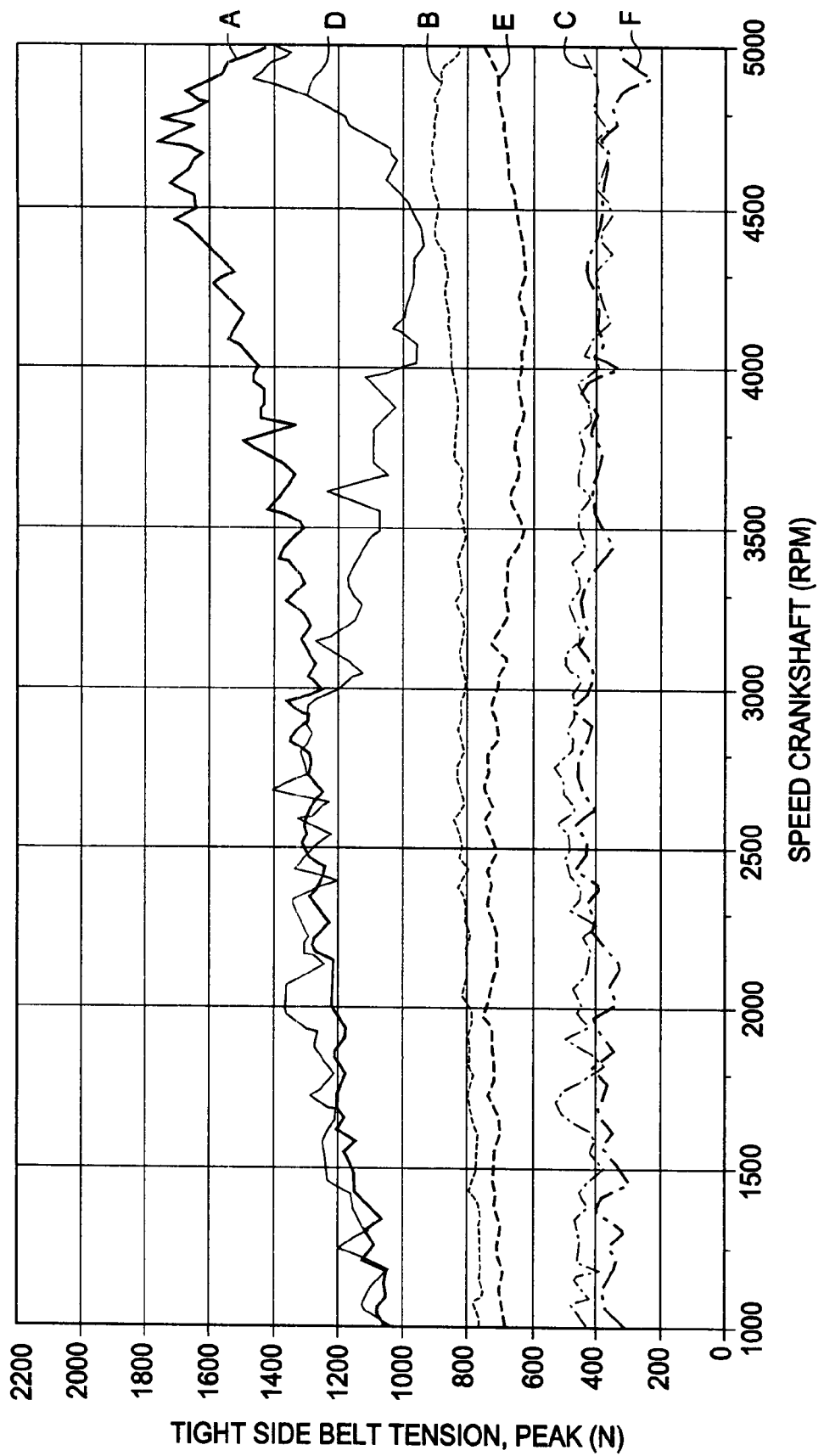
FIG. 13 is a chart showing the Tight Side Tension characteristic of an engine shown in FIG. 6 before and after application of an obround sprocket.

Similarly, FIG. 13 is a chart showing the effect of a correctly phased obround sprocket as described in FIG. 1 on a twin cam, four cylinder, four stroke engine as depicted in FIG. 6. Curves "A", "B" and "C" represent measured values for maximum, average and minimum dynamic tight side tensions respectively over a range of engine speeds for a prior art drive design. In this example, this tension was measured at position IDR in FIG. 6. For extended belt lifetime the belt tight side tension should be minimized. Curves "D", "E" and "F" represent measured values for maximum, average and minimum belt tight side tensions with the inventive sprocket in use. The resultant reduction in installation tight side tension is in the range of 50-60% in the resonant speed range of the engine (approximately 4000 rpm to approximately 4800 rpm). The decrease in belt tight side tension represents a significant improvement in the belt operating lifespan.

Although forms of the invention have been described herein, it will be obvious to those skilled in the art that variations may be made in the construction and relation of parts without departing from the spirit and scope of the inventions described herein.

We claim:

1. A synchronous belt drive system comprising:
an obround sprocket (10) having a toothed surface and at least one linear portion (16) connecting and separating by a predetermined length two arcuate portions (14,15), the arcuate portions having a constant radius (R1, R2), the linear portion having the predetermined length;
a second sprocket (300) having a toothed surface, the second sprocket engaged to the obround sprocket by an endless toothed member (200);
the second sprocket connected to a rotary load, the rotary load having cyclic torque fluctuations; and
a radius (R1) of the obround sprocket (10) oriented at a belt entry point (201) which coincides with a maximum amplitude of a cyclic torque fluctuation such that a span length (SL) beginning at said entry point and extending to said second sprocket of the endless toothed member is made to vary in a manner that substantially cancels the cyclic torque fluctuations.

2. The synchronous belt drive system as in claim 1, wherein the obround sprocket (10) is attached to an engine crankshaft.

3. The synchronous belt drive system as in claim 1, wherein the second sprocket (300) is connected to an engine camshaft.

4. The synchronous belt drive system as in claim 1, wherein the obround sprocket (10) further comprises a second linear portion.

5. The synchronous belt drive system as in claim 1, wherein the obround sprocket (10) further comprises:
at least three linear portions; and
wherein each linear portion is disposed between two arcuate portions, each arcuate portion having a constant radius.

6. The synchronous belt drive system as in claim 1, wherein the system minimizes torque fluctuations by timing the position of belt entry point (201) with the major length (ML) of the sprocket (10).

* * * * *